(12) United States Patent
Okamoto

(10) Patent No.: US 12,333,174 B2
(45) Date of Patent: Jun. 17, 2025

(54) DATA MANAGEMENT SYSTEM, VOLUME ACCESS CONTROL METHOD AND NON-TRANSITORY COMPUTER READABLE MEDIUM

(71) Applicant: Hitachi, Ltd., Tokyo (JP)

(72) Inventor: Kazuma Okamoto, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 357 days.

(21) Appl. No.: 17/939,370

(22) Filed: Sep. 7, 2022

(65) Prior Publication Data
US 2023/0244401 A1    Aug. 3, 2023

(30) Foreign Application Priority Data
Jan. 31, 2022    (JP) ................................ 2022-012977

(51) Int. Cl.
*G06F 3/06*    (2006.01)

(52) U.S. Cl.
CPC ............ *G06F 3/065* (2013.01); *G06F 3/0622* (2013.01); *G06F 3/0659* (2013.01); *G06F 3/0665* (2013.01); *G06F 3/067* (2013.01)

(58) Field of Classification Search
CPC ...... G06F 3/065; G06F 3/0622; G06F 3/0659; G06F 3/0665; G06F 3/067
See application file for complete search history.

(56) References Cited

U.S. PATENT DOCUMENTS

| | | | | |
|---|---|---|---|---|
| 2005/0268055 | A1* | 12/2005 | Nonaka | G06F 11/2069 711/162 |
| 2005/0289350 | A1* | 12/2005 | Schmidt-Karaca | G06F 21/31 713/176 |
| 2006/0112245 | A1 | 5/2006 | Ikegaya et al. | |
| 2011/0099345 | A1* | 4/2011 | Mitsui | G06F 11/2069 711/E12.103 |
| 2011/0167234 | A1* | 7/2011 | Nishibori | G06F 11/1456 711/E12.001 |
| 2012/0304189 | A1* | 11/2012 | Tominaga | G06F 3/0637 718/104 |

(Continued)

FOREIGN PATENT DOCUMENTS

JP    2006-146801 A    6/2006

*Primary Examiner* — Harris C Wang
(74) *Attorney, Agent, or Firm* — Volpe Koenig

(57) ABSTRACT

Security is improved when creating a remote copy pair while suppressing performance deterioration of the overall system. In a data management system 1, when a user logs in, a first storage (main site storage 20) uses an external authentication server 50 to authenticate the user's access to its own storage and retains issued authentication information. Subsequently, when a command instructing a creation of a remote copy pair of a first volume (P-VOL) of the first storage and a second volume (S-VOL) of a second storage (sub site storage 40) is issued based on the user's operation, the first storage sends a command to the second storage by appending the authentication information, and the second storage uses the authentication information and requests the external authentication server 50 to authenticate the user's access to its own storage and, when the authentication is successful, the first or second storage starts synchronization of data between the pair volume.

10 Claims, 11 Drawing Sheets

(56) References Cited

U.S. PATENT DOCUMENTS

| | | | |
|---|---|---|---|
| 2014/0108727 A1* | 4/2014 | Sakashita | G06F 3/061 |
| | | | 711/118 |
| 2015/0234618 A1* | 8/2015 | Miwa | G06F 3/0617 |
| | | | 711/165 |
| 2023/0244401 A1* | 8/2023 | Okamoto | G06F 3/0659 |
| | | | 726/28 |
| 2023/0259288 A1* | 8/2023 | Aritsuka | G06F 21/6218 |
| | | | 711/163 |

* cited by examiner

[ACCESS RIGHT MANAGEMENT TABLE]   110

| STORAGE | USER ID | RESOURCE GROUP |
|---|---|---|
| MAIN | User A | RSG A |
| | User B | RSG B |
| SUB | User A | RSG C |
| | User B | RSG D |

FIG. 5

[SESSION MANAGEMENT TABLE]   120

| STORAGE | SESSION ID | USER ID | AUTHENTICATED Cookie |
|---|---|---|---|
| MAIN | 1 | User A | Asdfghj..... |
| | 2 | User B | Zxcvbn...... |

FIG. 6

[RESOURCE GROUP MANAGEMENT TABLE]  130

| STORAGE | RESOURCE GROUP | VOLUME |
|---|---|---|
| MAIN | RSG A | P-VOL, Vol-A-X, Vol-A-Y, ... |
|  | RSG B | P-VOL', Vol-B-X, Vol-B-Y, ... |
| SUB | RSG C | S-VOL, Vol-C-X, Vol-C-Y, ... |
|  | RSG D | S-VOL', Vol-D-X, Vol-D-Y, ... |

[PAIR INFORMATION MANAGEMENT TABLE]    140

| STORAGE | P-VOL INFORMATION | S-VOL INFORMATION | COUNTERPART DEVICE INFORMATION | PAIR STATE |
|---|---|---|---|---|
| MAIN | P-VOL | S-VOL | SUB SITE STORAGE | PAIR FORMED |
| MAIN | VOL-X | VOL-Y | SUB SITE STORAGE | DATA NOT SYNCHRONIZED |
| MAIN | VOL_Z | VOL_ZZ | SUB' SITE STORAGE | PAIR FORMED |
| SUB | P-VOL | S-VOL | MAIN SITE STORAGE | PAIR FORMED |
| SUB | VOL-X | VOL-Y | MAIN SITE STORAGE | DATA NOT SYNCHRONIZED |

Columns: 141, 142, 143, 144, 145

FIG. 8

[EXTERNAL AUTHENTICATION SERVER INFORMATION]    150

| STORAGE | IP ADDRESS (HOST NAME) | ROUTE CERTIFICATE | USER DOMAIN | USER DOMAIN AUTHENTICATION INFORMATION |
|---|---|---|---|---|
| MAIN | <IP ADDRESS OF EXTERNAL AUTHENTICATION SERVER> | <ROUTE CERTIFICATE CAPABLE OF AUTHENTICATING EXTERNAL AUTHENTICATION SERVER> | DOMAIN A | XXXXXXXX |
| SUB | <IP ADDRESS OF EXTERNAL AUTHENTICATION SERVER> | <ROUTE CERTIFICATE CAPABLE OF AUTHENTICATING EXTERNAL AUTHENTICATION SERVER> | DOMAIN A | YYYYYYY |

Columns: 151, 152, 153, 154, 155

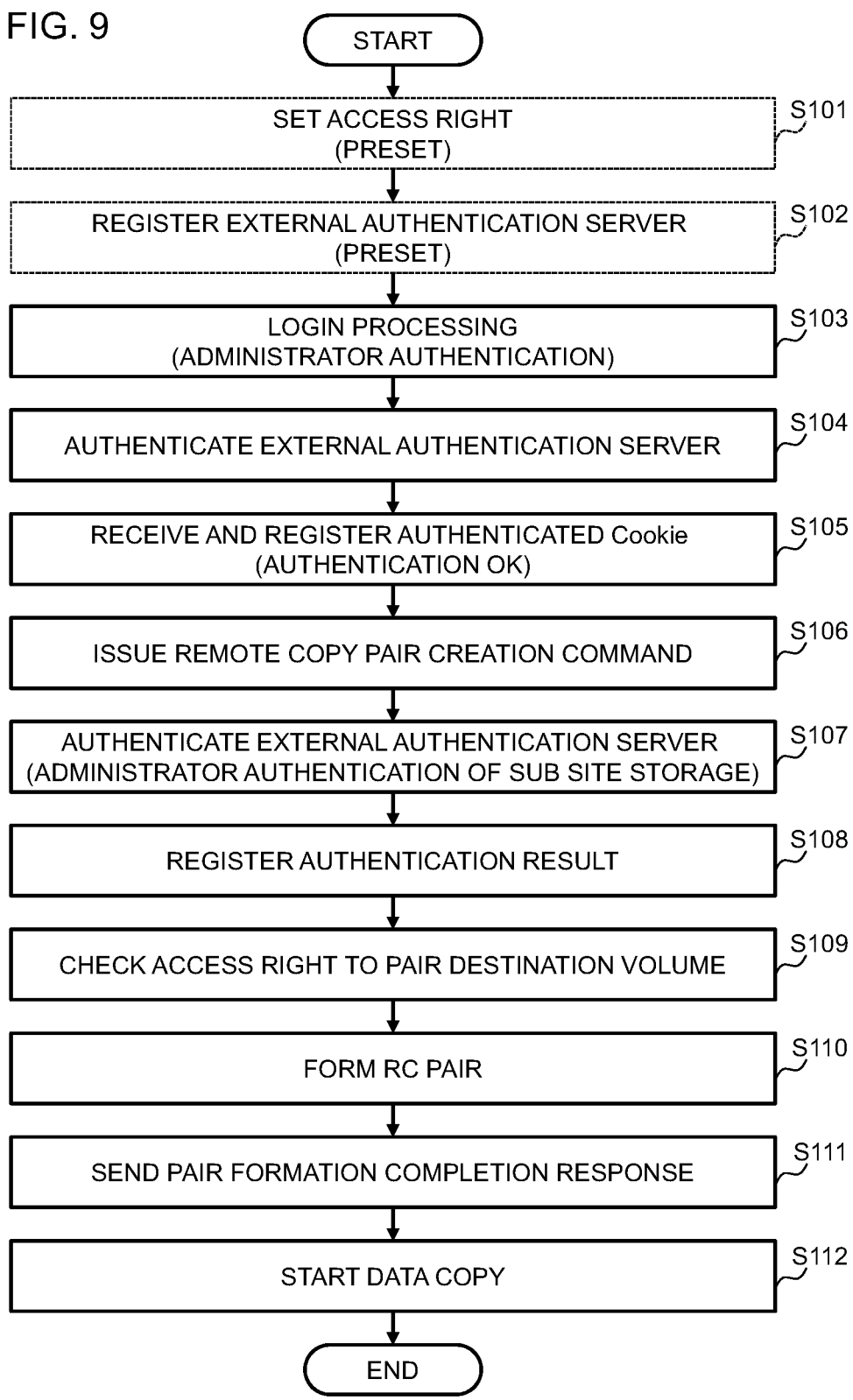

DATA MANAGEMENT SYSTEM, VOLUME ACCESS CONTROL METHOD AND NON-TRANSITORY COMPUTER READABLE MEDIUM

TECHNICAL FIELD

The present invention relates to a data management system, a volume access control method, and a non-transitory computer readable medium, and can be suitably applied to a data management system having a remote copy function of volume data, its volume access control method, and a non-transitory computer readable medium of a program.

BACKGROUND ART

Conventionally, known is a remote copy function of synchronizing data of volumes between two storage systems (main site storage, sub site storage). A remote copy pair can be created by issuing a remote copy pair creation command to the main site storage. Here, information of a volume of the main site storage and information of a volume of the sub site storage to form a pair state are designated.

For example, PTL 1 discloses a technology of restricting access to a remote volume in a storage system having a remote copy function without having to register in advance the corresponding information of accessibility to a host computer and a volume.

CITATION LIST

Patent Literature

[PTL 1] Japanese Unexamined Patent Application Publication No. 2006-146801

SUMMARY OF THE INVENTION

Problems to be Solved by the Invention

Meanwhile, in recent years, in the field of information security, it is said that conversion from a perimeter-based security model to a zero trust security model is required. With the zero trust security model, on the premise that all components in the information system do not trust each other (not trusting all communications between components), security measures need to be implemented in each component.

Nevertheless, with a conventional standard storage system, when creating a remote copy pair, since the access right to the volume set in the main site storage is not being checked, and since the access right to the volume of the sub site is not being checked, the actual condition is that the requirements in the zero trust security model are not being satisfied.

For example, when considering a case where a storage system is to be used by a plurality of organizations (companies or business divisions), if the access right to the volume set in the sub site storage is not checked, an administrator of a certain organization will be able to create a remote copy pair by designating a volume of the sub site assigned to another organization. In the foregoing case, the volume of the sub site assigned to another organization will be overwritten with the data of the volume of the main site for which the foregoing administrator has the access right. Accordingly, a certain organization may, with malice, rewrite the contents of the volume of another organization, and this will become a security issue.

As measures for dealing with the foregoing problem, considered may be checking the access right to the volume of the sub site, but in such a case, there is concern of deterioration in the performance due to the increase in the volumes to be checked and the increase in the communication load.

Moreover, the storage system disclosed in PTL 1 above is also taking measures to deal with the foregoing problem, and is realizing the restricted access to the sub site, which is not directly connected to the main site, by providing an intermediate site between the main site and the sub site, and forming copy pairs in multiple stages based on a cascade configuration via the intermediate site.

Nevertheless, with the storage system of PTL 1, since the intermediate site is indispensable in its configuration, the communication load of the overall system may increase. Moreover, the technology of PTL 1 attempts to restrict the access to the volume of the sub site in which a pair state has already been formed, and does not check the restriction of access to other volumes in which a pair state has not been formed in the sub site.

The present invention was devised in view of the foregoing points, and an object of the present invention is to propose a data management system, a volume access control method, and a non-transitory computer readable medium capable of improving security while suppressing the performance deterioration of the overall system by checking the user's access right to the volume of the sub site at the time of creating a remote copy pair.

Means to Solve the Problems

In order to achieve the foregoing object, the present invention provides a data management system capable of creating a remote copy pair with volumes of different storage systems, comprising: a first storage system which includes one or more volumes for storing data and performs communication related to a user's authentication with an external authentication server; and a second storage system which includes one or more volumes for storing data and performs communication related to a user's authentication with the external authentication server, wherein: when a user logs into the first storage system, the first storage system requests the external authentication server to authenticate the user's access right to the first storage system, and retains authentication information issued by the external authentication server when authentication is successful; when a remote copy pair creation command instructing a creation of a remote copy pair of a first volume of the first storage system and a second volume of the second storage system is issued by the first storage system based on the logged-in user's operation, the first storage system sends the remote copy pair creation command to the second storage system by appending the authentication information; the second storage system requests the external authentication server to authenticate the user's access right to the second storage system using the authentication information appended to the remote copy pair creation command; and when the authentication of the user's access right to the second storage system is successful, the first or the second storage system starts synchronization of data between the first volume and the second volume.

Moreover, in order to achieve the foregoing object, the present invention additionally provides a volume access control method performed by a data management system capable of creating a remote copy pair with volumes of different storage systems, wherein the data management system includes: a first storage system which includes one or more volumes for storing data and performs communication related to a user's authentication with an external authentication server; and a second storage system which includes one or more volumes for storing data and performs communication related to a user's authentication with the external authentication server, wherein the volume access control method comprises: a login step of the first storage system, when a user logs into the first storage system, requesting the external authentication server to authenticate the user's access right to the first storage system, and retaining authentication information issued by the external authentication server when authentication is successful; when a remote copy pair creation command instructing a creation of a remote copy pair of a first volume of the first storage system and a second volume of the second storage system is issued by the first storage system based on the logged-in user's operation, a command sending step of the first storage system sending the remote copy pair creation command to the second storage system by appending the authentication information; a sub site authentication step of the second storage system, after the command sending step, requesting the external authentication server to authenticate the user's access right to the second storage system using the authentication information appended to the remote copy pair creation command; and a data synchronization step of the first or the second storage system, when the authentication of the user's access right to the second storage system in the sub site authentication step is successful, starting synchronization of data between the first volume and the second volume.

Moreover, in order to achieve the foregoing object, the present invention additionally provides a non-transitory computer readable medium which records a program to be executed by a processor in a data management system capable of creating a remote copy pair with volumes of different storage systems, wherein the data management system is configured by including: a first storage system which includes one or more volumes for storing data and performs communication related to a user's authentication with an external authentication server; and a second storage system which includes one or more volumes for storing data and performs communication related to a user's authentication with the external authentication server, wherein the program executes: processing of the first storage system, when a user logs into the first storage system, requesting the external authentication server to authenticate the user's access right to the first storage system, and retaining authentication information issued by the external authentication server when authentication is successful; processing of the external authentication server authenticating the user's access right to the first storage system according to the request and issuing the authentication information when authentication is successful; when a remote copy pair creation command instructing a creation of a remote copy pair of a first volume of the first storage system and a second volume of the second storage system is issued by the first storage system based on the logged-in user's operation, processing of the first storage system sending the remote copy pair creation command to the second storage system by appending the authentication information; processing of the second storage system requesting the external authentication server to authenticate the user's access right to the second storage system using the authentication information appended to the remote copy pair creation command; processing of the external authentication server authenticating the user's access right to the second storage system according to the request; and processing of the first or the second storage system, when the authentication of the user's access right to the second storage system is successful, starting synchronization of data between the first volume and the second volume.

Advantageous Effects of the Invention

According to the present invention, when creating a remote copy pair, security can be improved while suppressing the performance deterioration of the overall system.

BRIEF DESCRIPTION OF DRAWINGS

FIG. 2 is a block diagram showing a modified example of the hardware configuration of the data management system 1.

FIG. 4 is a diagram showing an example of the access right management table 110.

FIG. 5 is a diagram showing an example of the session management table 120.

FIG. 6 is a diagram showing an example of the resource group management table 130.

FIG. 7 is a diagram showing an example of the pair information management table 140.

FIG. 8 is a diagram showing an example of the external authentication server information 150.

FIG. 9 is a flowchart showing a processing routine example of the remote copy pair creation processing of a normal version.

DESCRIPTION OF EMBODIMENTS

Figure 1:
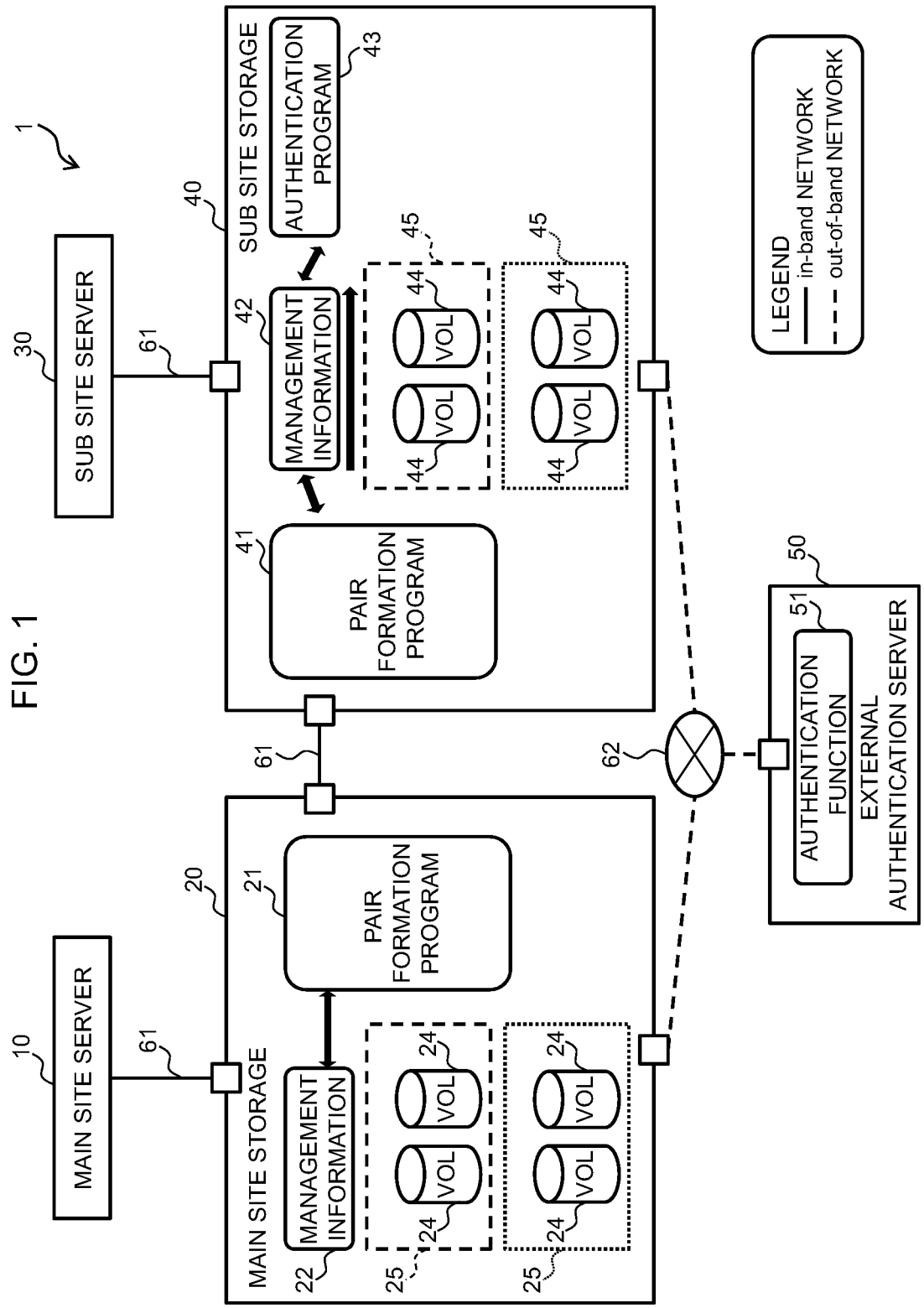
FIG. 1 is a block diagram showing a hardware configuration example of the data management system 1 according to an embodiment of the present invention.

An embodiment of the present invention is now explained in detail with reference to the appended drawings.

Note that the following descriptions and drawings are merely examples for explaining the present invention, and certain descriptions and drawings have been omitted or simplified as needed in order to clarify the explanation. Moreover, all combinations of the features explained in the embodiment may not necessarily be essential for the solution of the invention. Without limitation to the embodiments described herein, any and all applications that coincide with the concept of the present invention are included in the technical scope of the present invention. Those skilled in the art may make various additions or changes to the present invention within the scope of the present invention. The present invention can also be worked in various other modes. Unless specifically limited herein, each of the constituent elements may be singular or plural.

In the following explanation, while various types of information may be explained using expressions such as "table", "chart", "list", and "queue", the various types of information may also be expressed with other data structures. "XX table", "XX list" and the like may sometimes be referred to as "XX information" to show that it does not depend on the data structure. While expressions such as "identification information", "identifier", "name", "ID", and "number" are used in explaining the contents of each type of information, these are mutually replaceable.

Moreover, in the following explanation, when explaining similar elements without distinction, a reference character or a common number in a reference character will be used, and when explaining similar elements distinctively, a reference character of such element may be used or an ID assigned to such element in substitute for a reference character may be used.

Moreover, in the following explanation, while there are cases where processing, which is performed by executing programs, is explained, because a program performs predetermined processing by suitably using a storage resource (for example, memory) and/or an interface device (for example, communication port) as a result of being executed at least by one or more processors (for example, CPUs), the subject of the processing may also be the processor. Similarly, the subject of the processing to be performed by executing programs may be a controller, a device, a system, a computer, a node, a storage system, a storage device, a server, a management computer, a client or a host equipped with a processor. The subject (for example, processor) of the processing to be performed by executing programs may include a hardware circuit which performs a part or all of the processing. For example, the subject of the processing to be performed by executing programs may include a hardware circuit which executes encryption and decryption, or compression and expansion. The processor operates as function parts which realize predetermined functions by being operated according to programs. A device and a system including a processor are a device and a system including these function parts.

The programs may also be implemented in a device, such a computer, from a program source. The program source may be, for example, a program distribution server or a computer-readable storage media. When the program source is a program distribution server, the program distribution server includes a processor (for example, CPU) and a storage resource, and the storage resource may additionally store a distribution program and programs to be distributed. Furthermore, the processor of the program distribution server may distribute the programs to be distributed to another computer as a result of the processing of the program distribution server executing the distribution program. Moreover, in the following explanation, two or more programs may be realized as one program, and one program may be realized as two or more programs.

(1) System Configuration and Overview

FIG. 1 is a block diagram showing a hardware configuration example of the data management system 1 according to an embodiment of the present invention. As shown in FIG. 1, the data management system 1 comprises a main site server 10, a main site storage 20, a sub site server 30, a sub site storage 40, and an external authentication server 50.

The main site server 10 and the main site storage 20, the sub site server 30 and the sub site storage 40, and the main site storage 20 and the sub site storage 40 are respectively connected with an in-band network 61. The in-band network 61 is a network that is mainly used for sending and receiving data to be stored in a storage (specifically, for instance, customer's information assets to be stored in a volume), and a network for providing services to a customer may be used. Note that the in-band network 61 sometimes sends and receives storage management information.

The main site storage 20, the sub site storage 40, and the external authentication server 50 are connected via an out-of-band network 62. The out-of-band network 62 is a network for sending and receiving data to be used for managing the storage. The out-of-band network 62 is a management-only network, and data stored in the storage (specifically, for instance, customer's information assets to be stored in a volume) are not sent or received through the out-of-band network 62.

The main site server 10 is a higher-level device (host) of the main site storage 20, and is configured, for example, from a CPU, a memory, an input device, an output device, and an interface. The main site server 10 issues an IO request of the data stored in the volume 24 of the main site storage 20.

The main site storage 20 is a storage system which provides a main site (primary site), and is configured, for example, from a CPU, a memory, an external storage device, and an interface. The main site storage 20 configured from the foregoing hardware comprises, as shown in FIG. 1, a pair formation program 21, management information 22, and one or more volumes 24.

The pair formation program 21 is a program stored in the memory, and executes predetermined processing for creating a copy pair by being read out and executed by the CPU. Moreover, the pair formation program 21 includes a program for realizing the authentication function (external authentication function) using the external authentication server 50. Details of the specific processing based on the pair formation program 21 will be explained later with reference to flowcharts and sequence diagrams.

The management information 22 is various types of management information stored in the memory or the external storage device, and includes, for example, an access right management table 110, a session management table 120, a resource group management table 130, a pair information management table 140, and external authentication server information 150 described later. Details of each of these types of information will be explained later with reference to the specific examples of FIG. 4 to FIG. 8.

The volume 24 is a primary storage area storing the data of a customer (user), and is realized with an external storage device. In this example, while the volume 24 is explained as a logical area generated by being associated with a physical storage area of the external storage device, it may also be a physical area. Moreover, the storage area of the volume 24 may also be provided with a cloud or the like. The user's access right to each volume 24 is restricted according to the setting of the access right management table.

Note that, in this embodiment, a resource group function may be adopted for managing one or more volumes 24. The resource group function is a function of grouping resources (volumes) of the storage system and assigning the resource group to the user. Based on the resource group function, the user of the storage system (for example, the administrator of an organization) can only perform operations (editing or deletion of settings, creation of pairs, etc.) of resources of the resource group assigned to itself. In FIG. 1, a resource group 25 is shown as the group of the volumes 24 based on the resource group function. When the resource group function is adopted, the access right management table can manage the access right to the volumes 24 with the resource group 25 as a unit.

The sub site server 30 is a higher-level device (host) of the sub site storage 40, and is configured, for example, from a CPU, a memory, an input device, an output device, and an interface. The sub site server 30 issues an IO request of the data stored in the volume 44 of the sub site storage 40.

The sub site storage 40 is a storage system which provides a sub site (secondary site), and is configured, for example, from a CPU, a memory, an external storage device, and an interface. The sub site storage 40 configured from the foregoing hardware comprises, as shown in FIG. 1, a pair formation program 41, management information 42, an authentication program 43, and one or more volumes 44.

The pair formation program 41 is a program stored in the memory, and executes predetermined processing for creating a copy pair by being read out and executed by the CPU. Details of the specific processing based on the pair formation program 41 will be explained later with reference to flowcharts and sequence diagrams.

The authentication program 43 is a program stored in the memory, and realizes the authentication function (external authentication function) using the external authentication server 50 by being read out and executed by the CPU.

Note that the authentication program 43 is a program (authentication program 43) related to the external authentication function isolated from a pair formation program similar to the pair formation program 21 explained with reference to the main site storage 20, and in FIG. 2 the program related to the remaining copy pair creation function is shown as the pair formation program 41. To "isolate a program" means, for example, to cause the isolated program to be a separate module.

However, while this kind of configuration in which the authentication program 43 is isolated is a configuration that is required in the remote copy pair creation processing of the response performance improved version to be explained with reference to FIG. 12 and FIG. 13 within the remote copy pair creation processing of this embodiment, it is not particularly required in the remote copy pair creation processing of the normal version to be explained with reference to FIG. 9 to FIG. 11. In other words, when the data management system 1 is to execute the remote copy pair creation processing of the normal version, the pair formation program 41 may be implemented by including a program corresponding to the authentication program 43 (to put it differently, the pair formation program 41 of the sub site storage 40 may be a program that is similar to the pair formation program 21 of the main site storage 20).

Thus, in the following explanation, let it be assumed that the pair formation program 41 includes the copy pair creation function and the external authentication function in the remote copy pair creation processing of the normal version described later with reference to FIG. 9 to FIG. 11, and that the pair formation program 41 only includes the copy pair creation function and the authentication program 43 includes the external authentication function in the remote copy pair creation processing of the response performance improved version described later with reference to FIG. 12 and FIG. 13.

The management information 42 is various types of management information stored in the memory or the external storage device similar to the management information 22 of the main site storage 20, and includes, for example, an access right management table 110, a resource group management table 130, a pair information management table 140, and external authentication server information 150 described later. Details of each of these types of information will be explained later with reference to the specific examples of FIG. 4 and FIG. 6 to FIG. 8.

The volume 44 is a secondary storage area storing the data of a customer (user), and is realized with an external storage device. Similar to the volume 24 of the main site storage 20, in this example, while the volume 44 is explained as a logical area, it may also be a physical area. Moreover, the storage area of the volume 44 may also be provided with a cloud or the like. The access right of the user to each volume 44 is restricted according to the setting of the access right management table.

Note that, similar to the volume 24 of the main site storage 20, a resource group function may also be adopted for the volumes 44 of the sub site storage 40. Thus, in FIG. 1, a resource group 45 is shown as the group of the volumes 44 based on the resource group function. When the resource group function is adopted, the access right management table can manage the access right to the volumes 44 with the resource group 45 as a unit.

The external authentication server 50 is a server having an authentication function 51 which authenticates the user based on pre-registered user information, and a standard external authentication server may be used. In the external authentication server 50, information (ID, password, etc.) required for the authentication of a user is registered, regarding such user to access each site, from the management application (for example, the main-side client 11 and the sub-side client 31 described later) of each site before the remote copy pair creation processing is executed.

The management application (management AP) is now explained. The management application is an application program capable of executing predetermined processing to the main site storage 20 or the sub site storage 40 according to the user's operation. As the predetermined processing, the management application may, for example, execute the setting of access right information, registration of the external authentication server 50, login processing, and issue of the remote copy pair creation command. The management application is also referred to as a client when implemented in a computer or the like operated by the user.

In the data management system 1 according to this embodiment, there is no limit to the implementation site of the management application (client), and the management application (client) may be implemented in various locations. Implementation examples of the management application will be explained with reference to FIG. 2.

Figure 2:
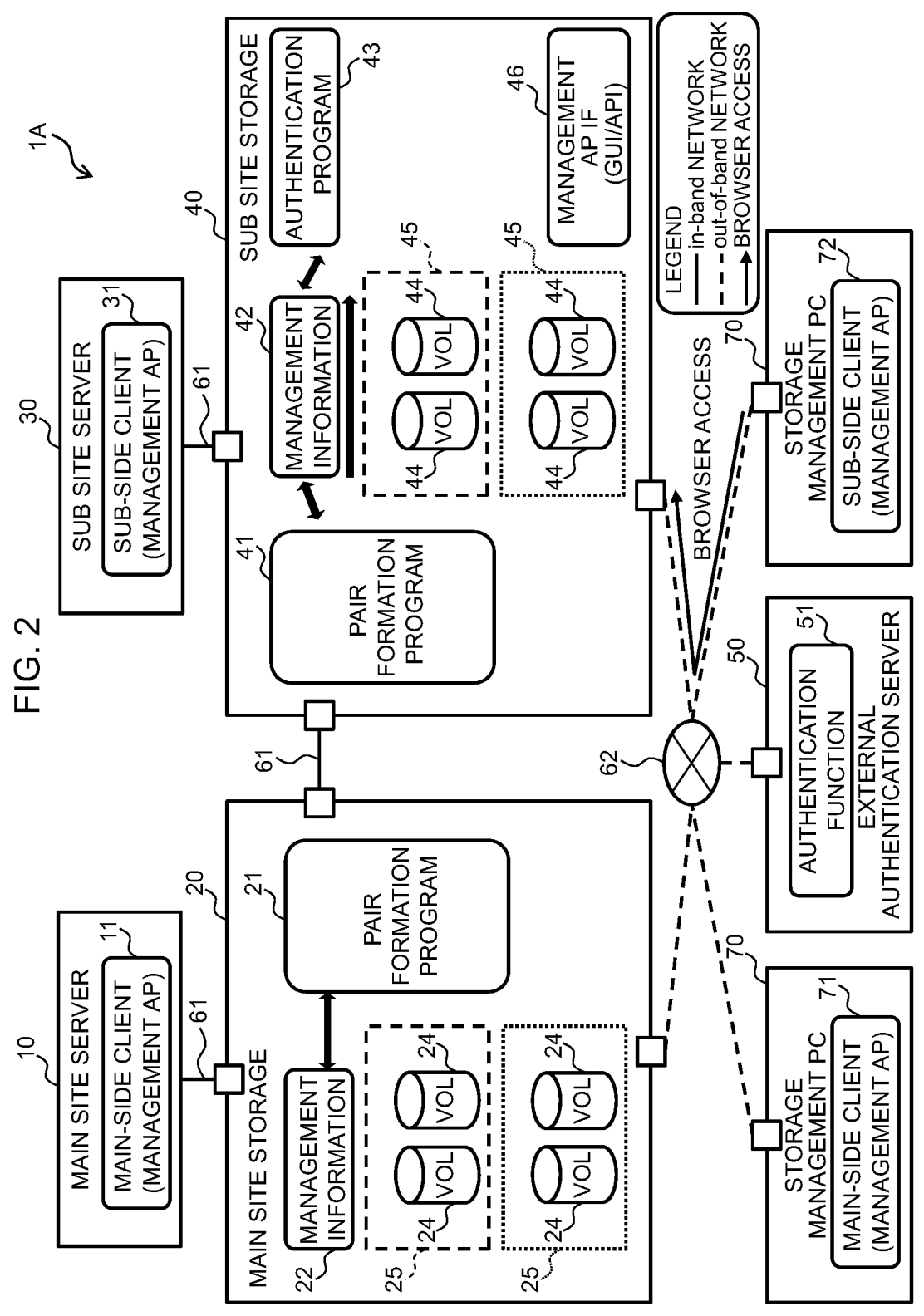

FIG. 2 is a block diagram showing a modified example of the hardware configuration of the data management system 1. The data management system 1A shown in FIG. 2 is a modified example of the data management system 1 shown in FIG. 1, and a storage management PC 70 has been added to the configuration of the data management system 1 shown in FIG. 1. The storage management PC 70 is a computer for managing the main or sub site storage, and is connected to the site storage to be managed or the external authentication server 50 via the out-of-band network 62.

FIG. 2 shows that the management application (client) can be implemented at various locations of the data management system 1A. For example, the main-side client 11 may be implemented in the main site server 10, and the sub-side client 31 may be implemented in the sub site server 30. Moreover, as another implementation example of the management application, the main-side client 71 and the sub-side client 72 may be implemented in the storage management PC 70.

Furthermore, with the data management system 1 (1A), even if it is a configuration in which a client does not exist in the computer to be connected to the main site storage 20 and the sub site storage 40, the management application installed in each site storage may be used via the out-of-band network 62. For example, FIG. 2 shows a configuration where the sub site storage 40 includes a management AP IF 46. The management AP IF 46 is an interface for operating the management application installed in the storage from the outside, and is a GUI (Graphical User Interface) or an API (Application Programming Interface). In the foregoing case, since the user can operate the management AP IF 46 from the storage management PC 70 with the browser access based on the out-of-band network 62, the user can perform the creation of a remote copy pair or the registration of the external authentication server 50.

Figure 3:
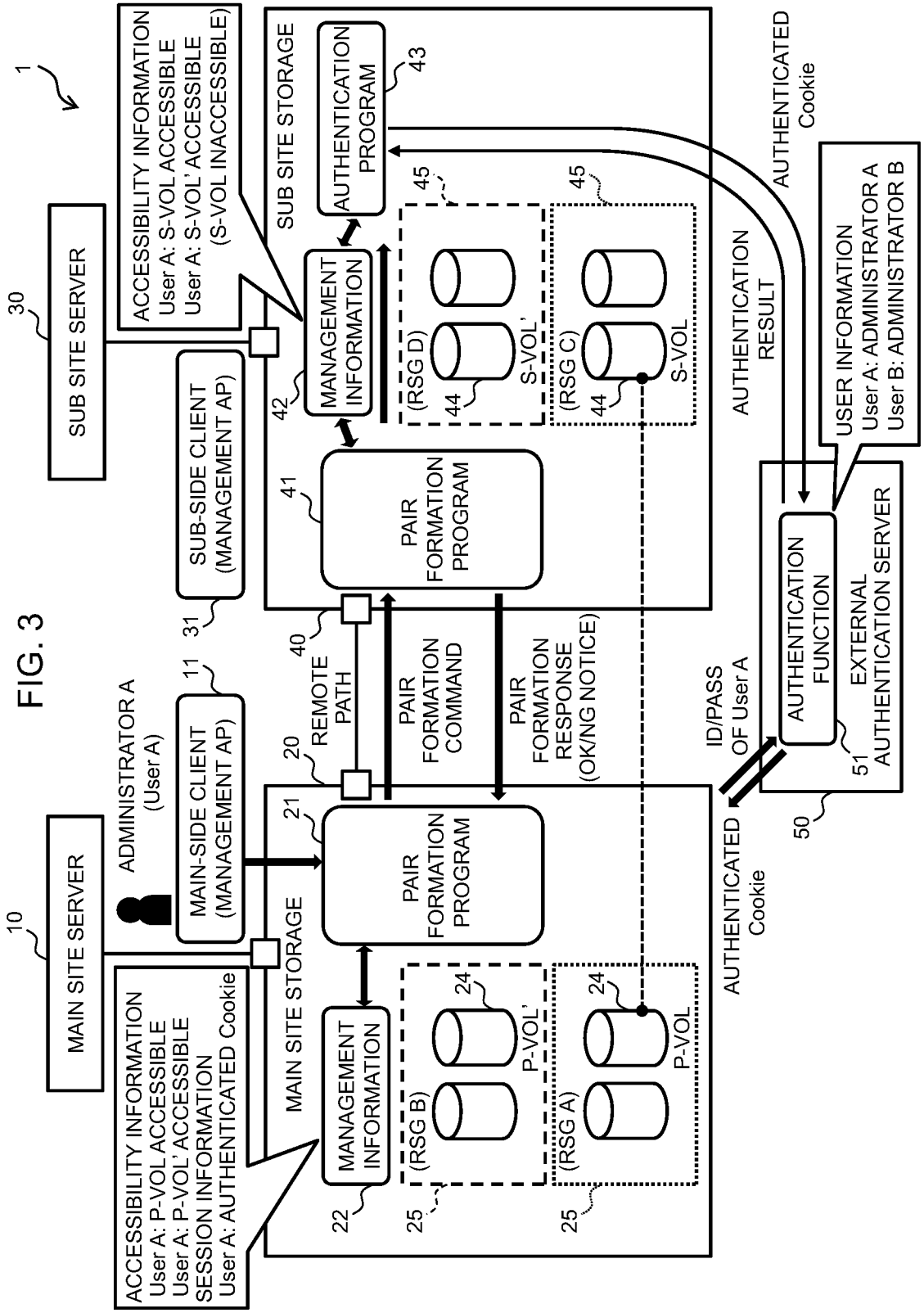
FIG. 3 is a diagram showing a processing image of creating a remote copy pair in the data management system 1.

FIG. 3 is a diagram showing a processing image of creating a remote copy pair in the data management system 1. FIG. 3 shows the processing image when the administrator A (User A) operates the main-side client 11 and attempts to create a remote copy pair between one (P-VOL) of the volumes 24 of the main site storage 20 and one (S-VOL) of the volumes 44 of the sub site storage 40.

Here, in order for the administrator A to perform operations related to the main site storage 20 from the main-side client 11, the administrator A needs to log into the main site storage 20. Furthermore, in order for the administrator A to create a remote copy pair of the P-VOL and the S-VOL, the administrator A needs to have the access right not only to the P-VOL, but also to the S-VOL. In this embodiment, the external authentication server 50 is used for this kind of user authentication of the administrator A. The user information required for the user authentication is pre-registered in the external authentication server 50 (see the user information shown in FIG. 3). Moreover, the user's access authority to the volumes 24 is pre-set in the management information 22 (access right management table 110) for each resource group 25, and the user's access authority to the volumes 44 is pre-set in the management information 42 (access right management table 110) for each resource group 45 (see accessibility information shown in FIG. 3).

In the case of FIG. 3, specifically, the administrator A has been registered as a user allowed to log into the main site storage 20, and has the access right to the volumes 24 (P-VOL, etc.) belonging to the resource group "RSGA" of the main site, and the access right to the volumes 44 (S-VOL, etc.) belonging to the resource group "RSGC" of the sub site. Meanwhile, the administrator A has not been granted the access right to the volumes 24 (P-VOL', etc.) belonging to the resource group "RSGB" and the volumes 44 (S-VOL', etc.) belonging to the resource group "RSGD".

After logging into the main site storage 20, the administrator A issues a remote copy pair creation command from the main-side client 11 to the main site storage 20. Here, information of the volume 24 (P-VOL) of the main site storage 20 and the volume 44 (S-VOL) of the sub site storage 40 to form a pair state is designated.

While the details will be described later, in the case of the remote copy pair creation processing of the normal version, the pair formation program 21 of the main site storage 20 that received the remote copy pair creation command performs authentication of the administrator A by using the external authentication server 50, checks the access right to the P-VOL by referring to the management information 22 when the authentication was successful, and, when the administrator A has the foregoing access right, communicates with the pair formation program 41 of the sub site storage 40 and forms a pair of the P-VOL and the S-VOL and synchronizes the data. Here, on the side of the sub site storage 40, the pair formation program 41 authenticates the administrator A by using the external authentication server 50, checks the access right to the S-VOL designated as the pair target by referring to the management information 42 when the authentication was successful, and forms a pair only when the administrator A has the foregoing access right.

In the case of the remote copy pair creation processing of the response performance improved version, since the pair formation program 41 having the copy pair creation function and the authentication program 43 having the external authentication function are isolated, processing performed by the sub site storage 40 differs from the normal version. In the foregoing case, when the pair formation program 41 receives the remote copy pair creation command, it activates the authentication program 43 on the one hand, and communicates with the pair formation program 21 and forms a pair state of the P-VOL and the S-VOL (provided that data is not synchronized at this point in time) on the other hand without waiting for the processing by the authentication program 43. Subsequently, the authentication program 43 authenticates the administrator A by using the external authentication server 50, checks the access right to the S-VOL when the authentication was successful, and, when it has been confirmed that the administrator A has the foregoing access right, synchronizes the data of the P-VOL and the S-VOL in which a pair state has already been formed.

The configuration of the data management system 1 (1A) according to this embodiment and the overview of the remote copy pair creation thereof were explained above. Programs for executing various processes in the computers (each server 10, 50 and each storage 20, 30, 40) comprising the data management system 1 (1A) are non-transiently recorded on a recording medium that can be read by the computer. Note that the data management system 1A shown in FIG. 2 is a modified example of the data management system 1, and, since its key configurations are common with the data management system 1, in the following explanation the data management system 1 is explained as a representative example.

(2) Data Configuration

In the following explanation, the configuration of various types of management information used in the data management system 1 will be explained in detail with reference to specific examples.

FIG. 4 is a diagram showing an example of the access right management table 110. The access right management table 110 is management information for managing the user's access authority to the volumes in the site, and is retained in the memory of the main site storage 20 and in the memory of the sub site storage 40. As described above, since a resource group function can be adopted in this embodiment, the access right management table 110 manages the access authority with the resource groups 25, 45, which are a result of classifying the volumes 24, 44, as the unit. Note that, on the assumption that the main site storage 20 and the sub site storage 40 are independent systems, it can be considered that the access right management table 110 retained in both sites will not synchronize data between the sites. Moreover, the access right management table 110 of each site may retain only information related to the volumes (resource group) of the own site.

The access right management table 110 shown in FIG. 4 is configured by including the data items of a storage 111, a user ID 112, and a resource group 113.

The storage 111 describes information (storage name and ID) capable of identifying the site storage having the volumes to be managed (resource group). In this example, "main" means the main site storage 20, and "sub" means the sub site storage 40. The user ID 112 describes the identifier (user ID) of the user to which the access right is granted. The resource group 113 describes information (resource group name and resource group ID) capable of identifying the resource groups 25, 45 to which the volumes 24, 44 to be managed belong.

FIG. 5 is a diagram showing an example of the session management table 120. The session management table 120 is management information for managing the session information used to identify the user who is using the site, and is at least retained in the memory of the main site storage 20.

The session management table 120 shown in FIG. 5 is configured by including the data items of a storage 121, a session ID 122, a user ID 123, and an authenticated Cookie 124.

The storage 121 describes information capable of identifying the site storage that is being used by the user. The storage 121 corresponds to the storage 111. The session ID 122 describes the identifier (session ID) that was granted to the session being used. The user ID 123 describes the identifier (user ID) of the user that is using the session. The user ID 123 corresponds to the user ID 112. The authenticated Cookie 124 describes the authenticated Cookie issued by the external authentication server 50 at the time of authenticating the user. By retaining this kind of session management table 120 as one type of management information 22, the main site storage 20 is able to send the authenticated Cookie issued from the external authentication server 50 in the user's login processing to the sub site storage 40, upon appending a pair formation command, and the sub site storage 40 that received the command can use the authenticated Cookie in checking the access right to the volume 44 (S-VOL).

FIG. 6 is a diagram showing an example of the resource group management table 130. The resource group management table 130 is management information for managing a resource group in which the groups in the site were grouped, and is retained in the memory of the main site storage 20 and in the memory of the sub site storage 40. As with the access right management table 110, it can be considered that the resource group management table 130 will not synchronize data between the main site side and the sub site side, and may retain only information related to the resource group of the own site.

The resource group management table 130 shown in FIG. 6 is configured by including the data items of a storage 131, a resource group 132, and a volume 133.

The storage 131 describes information capable of identifying the site storage having the target resource group. The storage 131 corresponds to the storages 111, 121. The resource group 132 describes information (resource group name and resource group ID) capable of identifying the resource groups 25, 45 to be managed. The resource group 132 corresponds to the resource group 113. The volume 133 describes information (volume name and ID) capable of identifying the volumes 24, 44 belonging to the resource groups 25, 45 to be managed.

FIG. 7 is a diagram showing an example of the pair information management table 140. The pair information management table 140 is management information for managing the volumes that formed a remote copy pair, and is retained in the memory of the main site storage 20 and in the memory of the sub site storage 40. Since the pair information management table 140 retained in both sites share the latest pair information, data having a pair relationship may also be synchronized at a predetermined timing in both sites.

The pair information management table 140 shown in FIG. 7 is configured by including the data items of a storage 141, P-VOL information 142, S-VOL information 143, counterpart device information 144, and a pair state 145.

The storage 141 describes information capable of identifying the site storage having one volume of the copy pair to be managed. The storage 141 corresponds to the storages 111, 121, 131. Note that the pair information management table 140 may also be configured to retain only data describing the identification information of the own site (in other words, pair information related to the volumes of the own site) in the storage 141. The P-VOL information 142 describes information capable of identifying the volume storing the primary data (copy source data) of the copy pair to be managed, and the S-VOL information 143 describes information capable of identifying the volume storing the secondary data (copy destination data).

The counterpart device information 144 describes information capable of identifying the site storage having the volume of the pair counterpart in the mode corresponding to the storage 141. For example, when the storage 141 is "main" (main site storage 20), the counterpart device information 144 describes "sub site storage" representing the sub site storage 40. In FIG. 1 to FIG. 3, while only one main site storage 20 and one sub site storage 40 are indicated, in the actual data management system 1, since one or more sub site storages 40 (for example, "sub' site storages") corresponding to one or more main site storages 20 exist, the pair information management table 140 describes and manages the items of the counterpart device information 144.

The pair state 145 describes the condition of the copy pair to be managed. The condition of the copy pair is specifically, for example, whether or not the data has been synchronized, and in FIG. 7 a condition in which a pair state has been formed but the data synchronization (data copy) has not been performed is described as "data not synchronized", and a condition in which a pair state has been formed and the data has also been synchronized is described as "pair formed".

By retaining this kind of pair information management table 140, the main site storage 20 and the sub site storage 40 can manage the pair relationship of the remote copy pair and the condition thereof.

FIG. 8 is a diagram showing an example of the external authentication server information 150. The external authentication server information 150 is management information required for receiving external authentication by the authentication function 51 of the external authentication server 50, and is retained in the memory of the main site storage 20 and in the memory of the sub site storage 40.

The external authentication server information 150 shown in FIG. 8 is configured by at least including the data items of a storage 151, an IP address 152, and a route certificate 153. The storage 151 describes information capable of identifying each site storage. The external authentication server information 150 may retain only information related to the own site (record in which the own site has been registered in the storage 151). The storage 151 corresponds to the storages 111, 121, 131, 141. The IP address 152 describes the IP address of the external authentication server 50 to receive external authentication, and the route certificate 153 retains a route certificate capable of authenticating the external authentication server 50.

Note that the external authentication server 50 may be configured to manage users in a domain unit which is also adopted in a standard external authentication server and, in such a case, the external authentication server information 150 may additionally retain a user domain 154 indicating the identification information (user domain ID) of the user domain, and user domain authentication information 155 indicating the user domain authentication information.

As described above, the external authentication server 50 in this embodiment will be sufficient so as long as it is able to execute the external authentication of a pre-registered user, and a conventionally known external authentication server may be used. Thus, the detailed explanation related to the external authentication server 50 is omitted.

(3) Remote Copy Pair Creation Processing

In the following explanation, as the remote copy pair creation processing to be executed in the data management system 1 according to this embodiment, the remote copy pair creation processing of a "normal version" and the remote copy pair creation processing of a "response performance improved version" are explained in detail. The "normal version" is the remote copy pair creation processing of the sub site creating a remote copy pair, with a relatively simple configuration, upon checking the user's access right to the own volumes of the pair target. The "response performance improved version" is the remote copy pair processing for seeking improvement in the response time in comparison to the normal version, and is configured from a processing routine which enables the pair formation completion response to be returned from the sub site storage 40 to the main site storage 20 faster than that of the normal version.

(3-1) Normal Version

FIG. 9 is a flowchart showing a processing routine example of the remote copy pair creation processing of a normal version. The flow of the overall processing of the remote copy pair creation processing of the normal version is now explained with reference to FIG. 9.

According to FIG. 9, foremost, as the pre-setting to be performed before the creation of a remote copy pair is started, the administrator of each site storage of main and sub sets, in the corresponding site storage via the management AP, the access right of the user, who is using the volumes 24, 44, to such volumes (step S101), and registers the external authentication server 50 in which the user information has been registered (step S102).

After the foregoing pre-setting is complete, when a certain user attempts to create a remote copy pair, the corresponding user foremost logs into the main site storage 20 from the main site management AP (main-side client 11) (step S103). Here, login processing from the main-side client 11 to the main site storage 20 is executed. Subsequently, the main site storage 20 that received the login processing uses the external authentication server 50 and performs external authentication on whether the corresponding user is the user who has been set as being able to log into the own storage (whether the user is the administrator registered in the user information) (step S104). When this external authentication is successful, the external authentication server 50 issues authentication information (authenticated Cookie) certifying that the user has the qualification, and the main site storage 20 receives this authenticated Cookie and registers it in the management information 22 (step S105).

After the processing up to step S105 is completed, the user instructs the management AP (main-side client 11) to create a remote copy pair. Upon receiving this instruction, the main-side client 11 issues a remote copy pair creation command to the main site storage 20 (step S106).

The main site storage 20 that received the remote copy pair creation command checks the user's access right to the volume 24 (P-VOL) of the own site to form a pair, and thereafter sends the command to the sub site storage 40 having the volume 44 (S-VOL) to form a pair upon appending the user's authenticated Cookie received at the time of external authentication.

Subsequently, the sub site storage 40 that received the pair formation program 41 uses the external authentication server 50 and performs external authentication on whether the user is an administrator who has been registered in the user information (step S107). When this external authentication is successful, the sub site storage 40 registers the authentication result in the management information 42 (step S108).

Subsequently, the sub site storage 40 checks the user's access right to the volume 44 (S-VOL) of the own site designated for forming a pair (step S109). Once the user's access right is confirmed, the sub site storage 40 registers the formation of a remote copy pair with the P-VOL and the S-VOL in the management information 42 (step S110).

When the formation of a remote copy pair is registered on the sub site side, the sub site storage 40 returns, to the main site storage 20, the completion of pair formation on the sub site side. Subsequently, the main site storage 20 that received the pair formation completion response returns the pair formation completion response to the main-side client 11 (step S111), and starts the data copy between the P-VOL and the S-VOL (step S112). The remote copy pair creation processing of the normal version is thereby ended.

Figure 10:
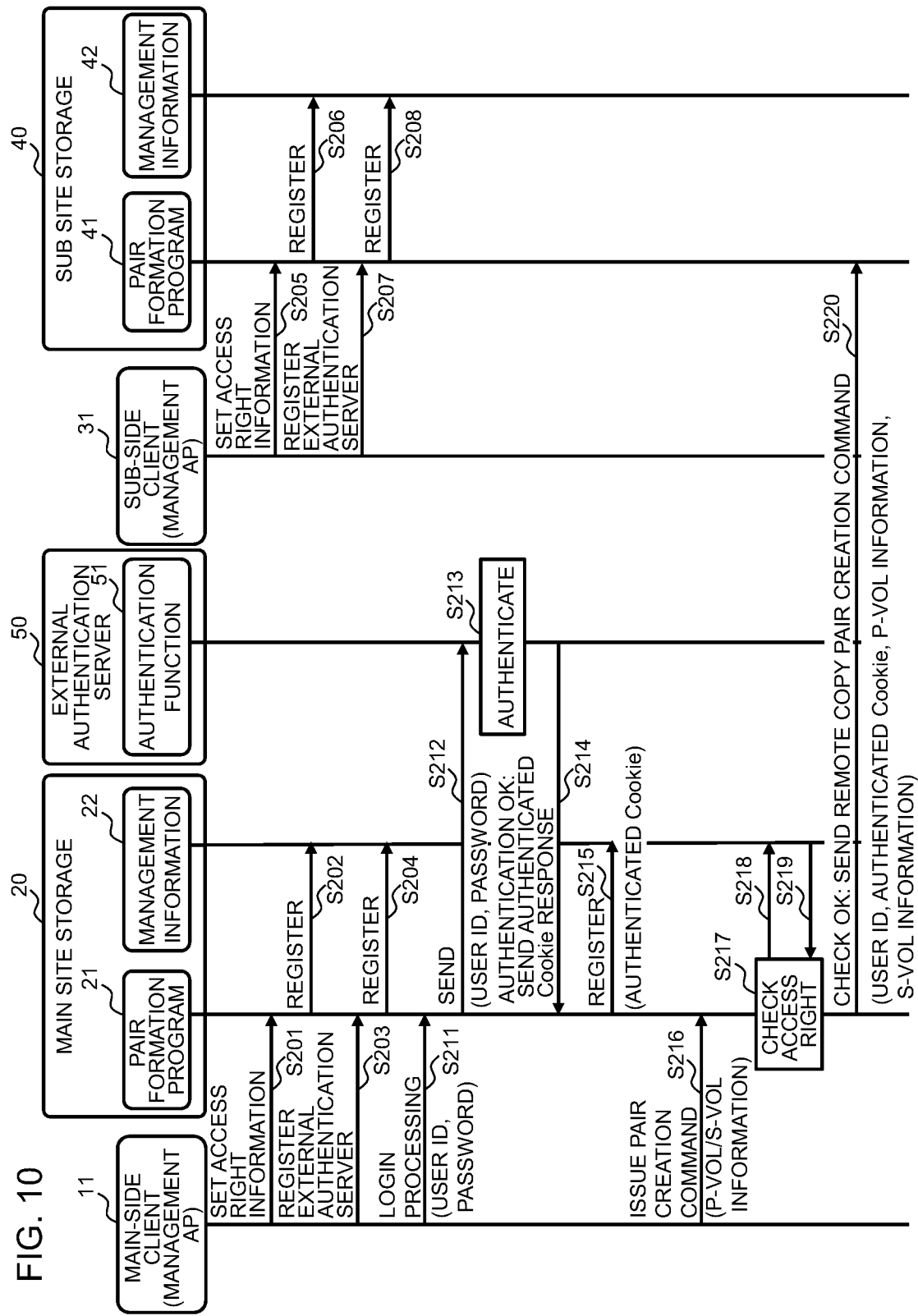
FIG. 10 is a sequence diagram (Part 1) showing further details of the processing routine of FIG. 9.
Figure 11:
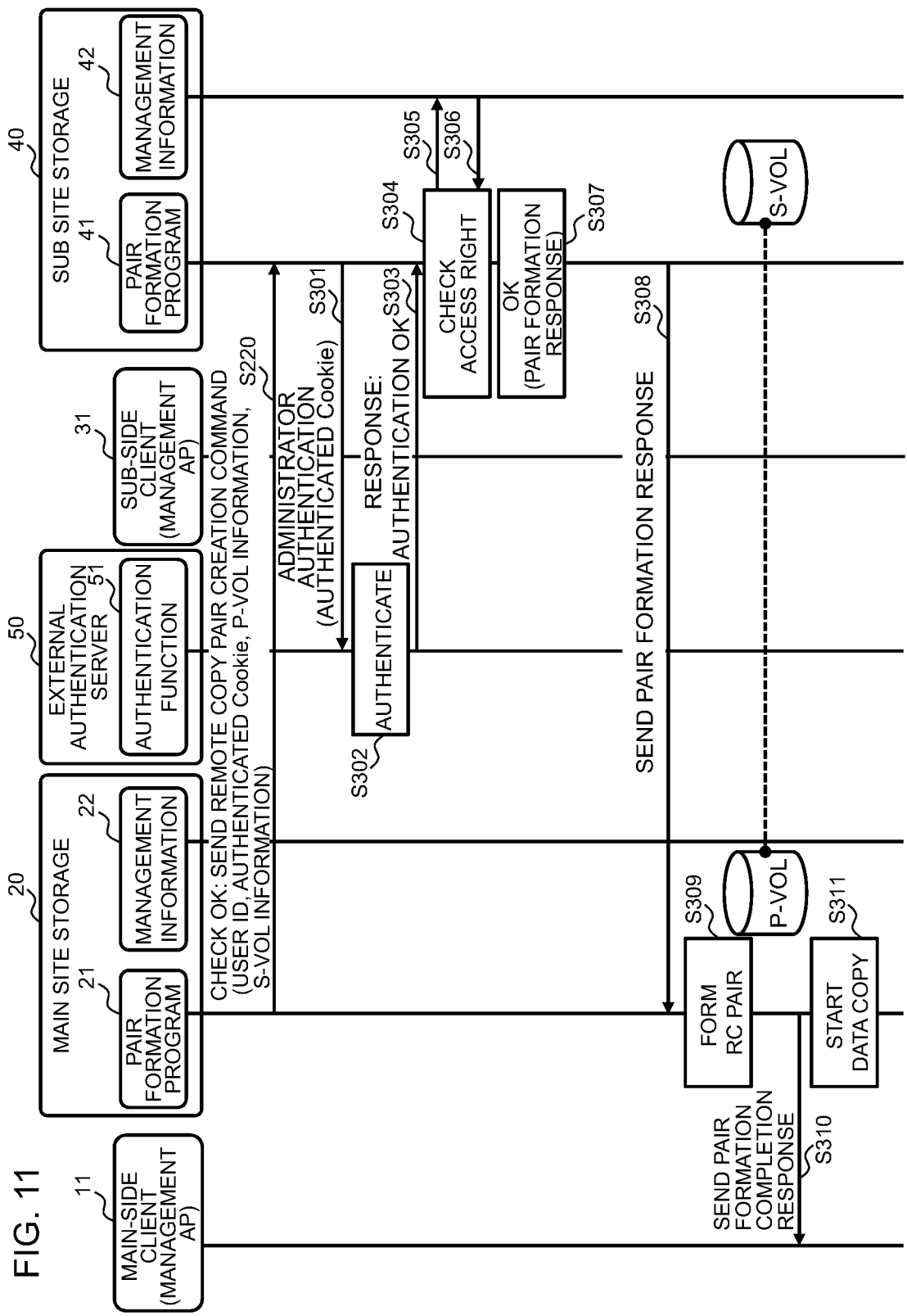
FIG. 11 is a sequence diagram (Part 2) showing further details of the processing routine of FIG. 9.

FIG. 10 and FIG. 11 are sequence diagrams (Part 1, Part 2) showing further details of the processing routine of FIG. 9. Details of each processing of the remote copy pair creation processing of the normal version described above are now explained with reference to FIG. 10 and FIG. 11.

According to FIG. 10, foremost, as the pre-setting, the main and sub clients set the user's access right to the volumes and registers the external authentication server 50, in which the user information has been registered, in the corresponding site storage.

Specifically, on the main site side, the main-side client 11 sends a command requesting the setting of the access right information to the main site storage 20 according to the operation of the administrator of the main site storage 20 (step S201), and the pair formation program 21 registers the access right information in the management information 22 (more specifically, in the access right management table 110) (step S202). Moreover, the main-side client 11 sends a command requesting the registration of the external authentication server 50 to the main site storage 20 according to the operation of the administrator of the main site storage 20 (step S203), and the pair formation program 21 registers information related to the external authentication server 50 in the management information 22 (more specifically, in the external authentication server information 150) (step S204). Furthermore, the sub site side also performs the same processing as steps S201 to S204 (step S205 to S208).

Next, when the creation of a remote copy pair is started, the main-side client 11 executes login processing to the main site storage 20 so that the user can log into the main site storage 20 (step S211). In this login processing, the user ID of the user trying to log in and the password that was pre-set by being linked to the user ID are sent to the pair formation program 21 of the main site storage 20. Subsequently, the pair formation program 21 sends the received user ID and password to the external authentication server 50 (step S212). The external authentication server 50 performs authentication by comparing the received user ID and password with the pre-registered user information (step S213), and, when there is corresponding information, returns an authenticated Cookie to the pair formation program 21 as a response of "authentication OK" (step S214). This authenticated Cookie can be used as the authentication information showing that the user is qualified to log into the main site storage 20. The pair formation program 21 registers the received authenticated Cookie in the management information 22 (more specifically, in the session management table 120) (step S215).

Next, when the user designates the volumes (in this example, P-VOL and S-VOL) to form a pair and inputs a remote copy pair creation command, the main-side client 11 issues a remote copy pair creation command to the pair formation program 21 (step S216). The remote copy pair creation command of step S216 includes information of designating the volumes 24, 44 to form a pair (P-VOL information related to the P-VOL, S-VOL information related to the S-VOL). The input command of the repair copy pair input by the user in step S216 is the same as the input command of the remote copy pair in a conventional standard data management system.

Next, the pair formation program 21 refers to the access right management table 110 and the resource group management table 130 of the management information 22 and checks the user's access right to the P-VOL based on the user ID authenticated in steps S211 to S214 and the P-VOL information included in the remote copy pair creation command of step S216 (step S217 to S219).

Subsequently, when it has been confirmed that the user has the access right to the P-VOL (check OK), the pair formation program 21 sends a remote copy pair creation command to the pair formation program 41 of the sub site storage 40 (step S220). The remote copy pair creation command sent in step S220 includes the user ID and the authenticated Cookie in addition to the P-VOL information and the S-VOL information that were included at the time of step S216. The user ID has been received from the main-side client 11 in the login processing of step S211, and the authenticated Cookie has been received from the external authentication server 50 in step S213 (authenticated Cookie registered in the management information 22 in step S215 may also be read out).

The processing of step S220 onward is shown in FIG. 11. According to FIG. 11, the pair formation program 41 that received the remote copy pair creation command in step S220 sends the authenticated Cookie included in the command to the external authentication server 50 (step S301). The external authentication server 50 uses the received authenticated Cookie and authenticates whether the user is a user who has been pre-registered in the user information (whether the user is registered as an administrator of the sub site storage 40) (step 302), and, when the authentication is successful, returns a response of "authentication OK" to the pair formation program 41 (step S303). When the pair formation program 41 receives the response of "authentication OK", it registers the user ID and the authenticated Cookie in the session management table 120 of the management information 42. Note that, when the management information 42 does not have the session management table 120, this registration processing does not have to be performed.

Next, the pair formation program 41 refers to the access right management table 110 and the resource group management table 130 based on the user ID and the S-VOL information included in the remote copy pair creation command, and checks the user's access right to the S-VOL (step S304 to S306).

When it has been confirmed that the user has the access right to the S-VOL, the pair formation program 41 registers the formation of a pair state with the P-VOL and the S-VOL in the pair information management table 140 of the management information 42 (step S307). Subsequently, the pair formation program 41 returns the completion of pair formation on the sub site side to the pair formation program 21 of the main site storage 20 (step S308).

The pair formation program 21 that received the pair formation completion response forms a pair state with the P-VOL and the S-VOL (step S309), and registers this pair state in the pair information management table 140 of the management information 22. Subsequently, the pair formation program 21 returns the completion of formation of a remote copy pair to the main-side client 11 (step S310), and starts the data copy between the P-VOL and the S-VOL (step S311).

As a result of the processing of the remote copy pair creation processing of the normal version being performed, the data management system 1 forms a remote copy pair and synchronizes the data between the designated P-VOL and S-VOL so as long as it is confirmed that the user has the access right to both volumes.

When this kind of data management system 1 is configured to include the external authentication server 50 which authenticates the user at the time of logging into the site storage as shown in FIG. 1 to FIG. 3, no special additional configuration for confirming the user's access right to the sub site-side volume 44 (S-VOL) is required. Even in a conventional data management system, the configuration of using an external authentication server for authenticating the user at the time of the login is common. Accordingly, the data management system 1 according to this embodiment can confirm whether the user who logged into the main site storage 20 has the access right to the volumes 44 of the sub site storage 40 without having to add any special configuration. Moreover, the volumes to be checked for the access right may be limited to the two volumes (P-VOL, S-VOL) designated as the pair target. Thus, according to the data management system 1 of this embodiment, security can be improved by checking the access right to both volumes to be paired while suppressing the increase in the communication load associated with the addition of configuration and the increase in the processing load associated with the increase in the items to be checked (in other words, while suppressing the performance deterioration of the overall system).

Moreover, as explained in step S216 of FIG. 10, in the data management system 1, the contents of the remote copy pair creation command input by the user do not need to be changed from the contents of a conventional standard remote copy pair creation command. Thus, according to the data management system 1 of this embodiment, security can be improved without any additional operational burden on the user.

(3-2) Response Performance Improved Version

Figure 12:
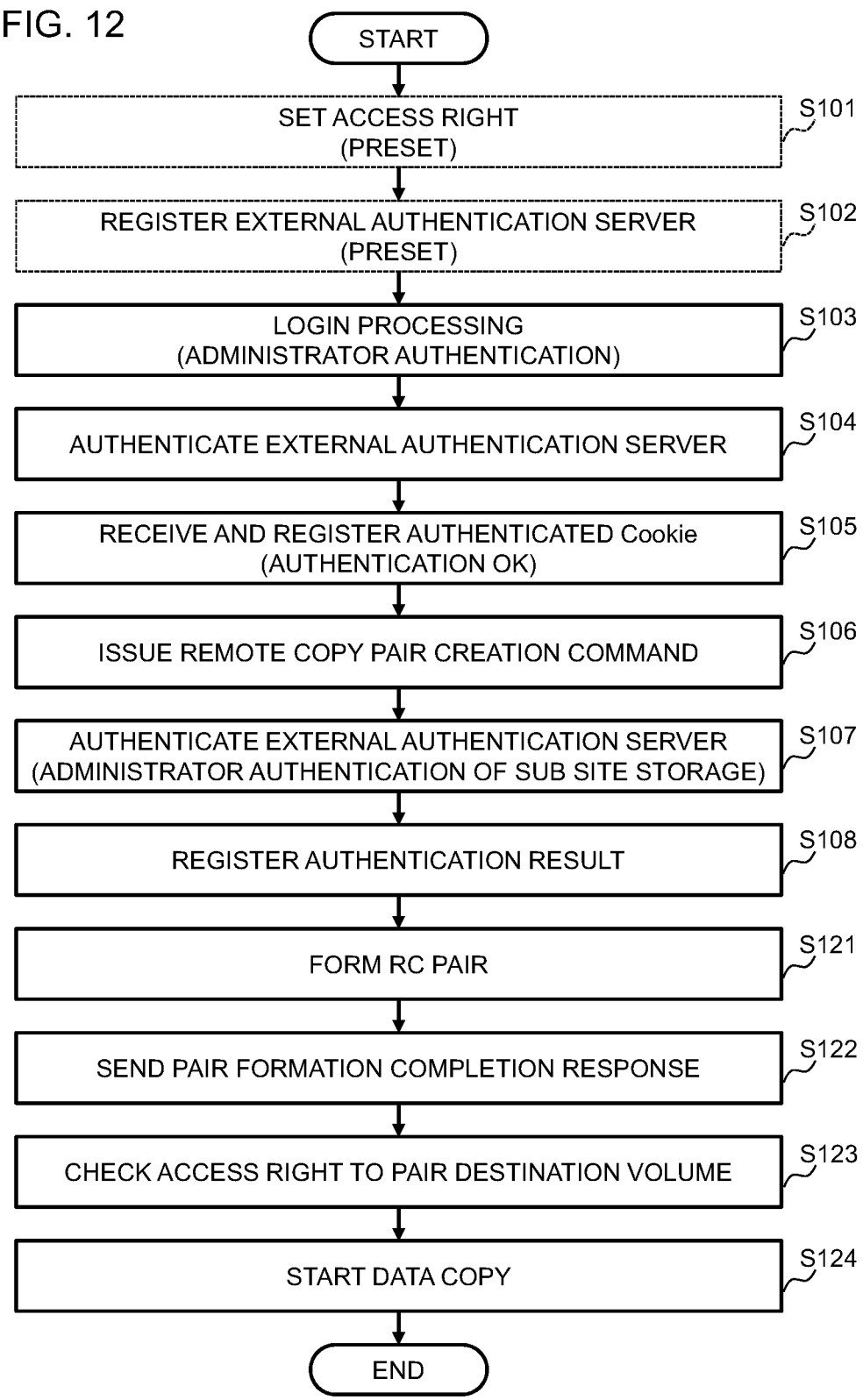
FIG. 12 is a flowchart showing a processing routine example of the remote copy pair creation processing of a response performance improved version.

FIG. 12 is a flowchart showing a processing routine example of the remote copy pair creation processing of a response performance improved version. Similar to the processing of FIG. 9, while the processing of steps S101 to S102 is the operation of pre-setting that is performed before the operation of creating the remote copy pair is started, in order to facilitate the understanding the overall processing flow, it is described in FIG. 12. Note that, in the explanation of the response performance improved version, the explanation of parts that overlap with the normal version is omitted.

In FIG. 12, step S101 of performing pre-setting to step S108 of performing external authentication and registering the authentication result in the sub site storage 40 are the same processing routine as FIG. 9. However, in the response performance improved version, since the authentication program 43 performs the authentication function separately from the pair formation program 41, the processing of the sub site storage 40 using the external authentication server 50 and externally authenticating whether the user is an administrator (step S107) and the processing of registering the authentication result (step S108) are executed by the authentication program 43.

After step S108, the sub site storage 40 registers the formation of a remote copy pair with the S-VOL and the P-VOL in the management information 42 before checking the user's access right to the volume 44 (S-VOL) to be paired (step S121).

When the formation of a remote copy pair is registered on the sub site side, the sub site storage 40 replies the completion of pair formation on the sub site side to the main site storage 20. Subsequently, the main site storage 20 that received the pair formation completion response returns the pair formation completion response to the main-side client 11 (step S122). Accordingly, when the main-side client 11 issues a remote copy pair creation command, it can receive the response earlier than the normal version shown in FIG. 9.

However, at this stage, while the pair state of the P-VOL and the S-VOL is formed, data synchronization (data copy) has not yet been performed. Thus, in the sub site storage 40, the authentication program 43 checks the user's access right to the S-VOL (step S123). Subsequently, when the user's access right is confirmed, the sub site storage 40 starts the data copy between the P-VOL and the S-VOL (step S124). The remote copy pair creation processing of the response performance improved version is thereby ended.

Figure 13:
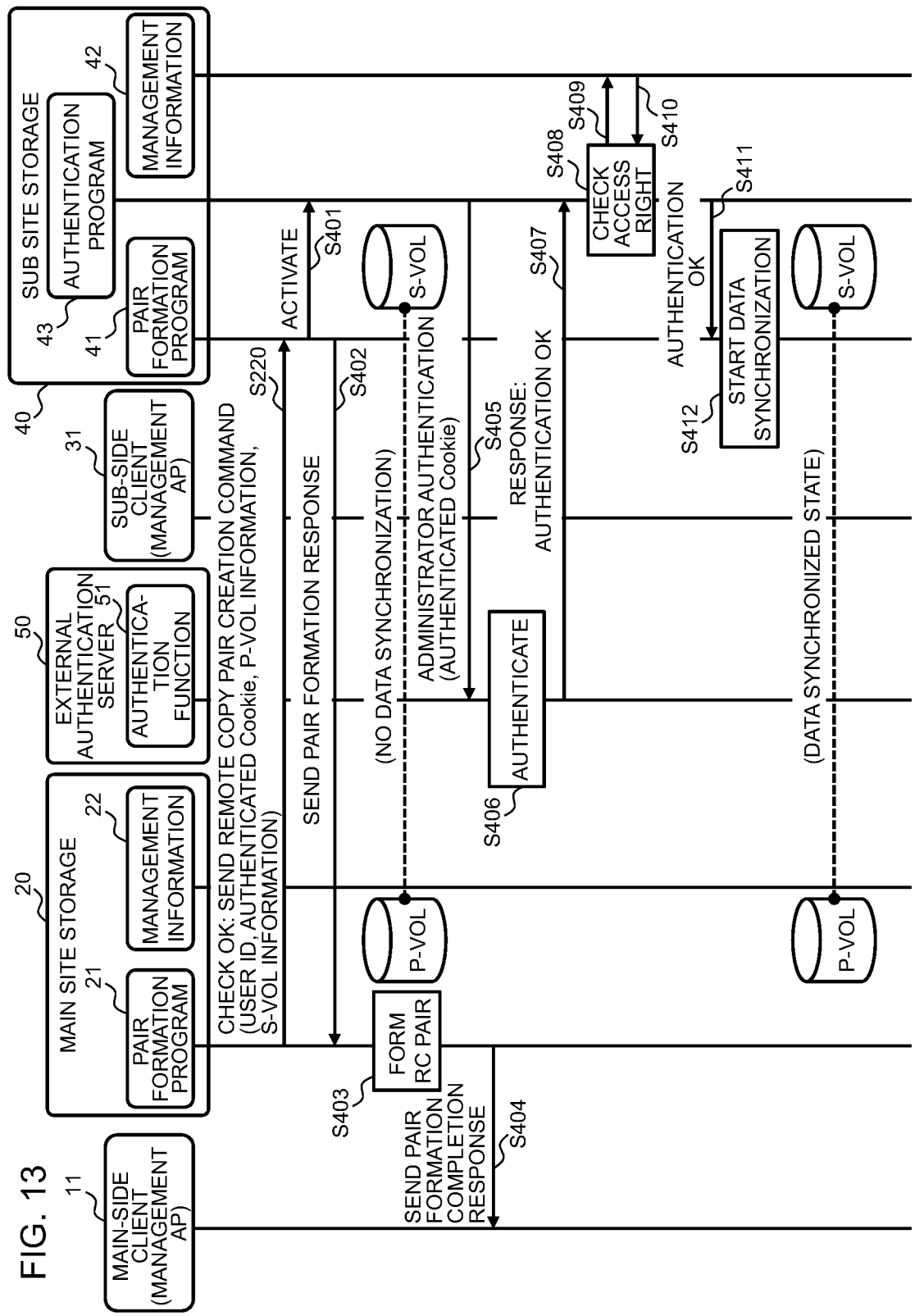
FIG. 13 is a sequence diagram showing further details of a part of the processing routine of FIG. 12.

FIG. 13 is a sequence diagram showing further details of a part of the processing routine of FIG. 12. As also mentioned in the explanation of FIG. 12, since the processing routine of the response performance improved version is the same as the processing routine of the normal version until the remote copy pair creation command is sent from the main site side to the sub site side, FIG. 13 shows the processing of step S220 shown in FIG. 10 of the normal version.

According to FIG. 13, the pair formation program 41 that received the remote copy pair creation command in step S220 activates the authentication program 43 (step S401). Subsequently, the pair formation program 41 registers the formation of a pair state with the P-VOL and the S-VOL in the pair information management table 140 of the management information 42, and returns the completion of pair formation on the sub site side to the pair formation program 21 of the main site storage 20 (step S402).

The pair formation program 21 that received the pair formation completion response forms a pair state with the P-VOL and the S-VOL (step S403), and registers this pair state in the pair information management table 140 of the management information 22. Subsequently, the pair formation program 21 returns the completion of formation of the remote copy pair to the main-side client 11 (step S404). As a result of the processing of step S404 being completed, the user can recognize that a remote copy pair has been created between the P-VOL and the S-VOL.

Next, in the sub site storage 40, the authentication program 43 activated in step S401 performs the user's administrator authentication and checks the user's access right to the S-VOL for actually starting the synchronization of data between the volumes of the remote copy pair.

Specifically, foremost, the authentication program 43 sends, to the external authentication server 50, the authenticated Cookie included in the remote copy pair creation command that was received by the pair formation program 41 in step S220 (step S405). The external authentication server 50 uses the received authenticated Cookie and authenticates whether the user is a user who has been pre-registered in the user information (whether the user has been registered as an administrator of the sub site storage 40) (step S406), and, when the authentication is successful, returns a response of "authentication OK" to the authentication program 43 (step S407). When the authentication program 43 receives the response of "authentication OK", it registers the user ID and the authenticated Cookie in the session management table 120 of the management information 42. Note that, when the management information 42 does not have the session management table 120, this registration processing does not need to be performed.

Next, the authentication program 43 refers to the access right management table 110 and the resource group management table 130 of the management information 42 and checks the user's access right to the S-VOL based on the user ID and the S-VOL information included in the remote copy pair creation command (step S408 to S410).

When it has been confirmed that the user has the access right to the S-VOL, the authentication program 43 sends the result of "authentication OK" to the pair formation program 41 (step S411), and, upon receiving this result, the pair formation program 41 starts the data synchronization (data copy) between the P-VOL and the S-VOL that have formed a pair (step S412). Consequently, data is synchronized between the remote copy pair of the P-VOL and the S-VOL that returned the pair formation completion response to the main-side client 11 in step S404, and the creation of the remote copy pair is thereby ended.

As a result of the remote copy pair creation processing of the response performance improved version being performed as described above, the data management system 1 forms a remote copy pair and synchronizes the data between the designated P-VOL and S-VOL so as long as it is confirmed that the user has the access right to both volumes based on a configuration that is similar to the remote copy pair creation processing of the normal version. Accordingly, as an effect that is similar to the data management system 1 when the remote copy pair creation processing of the normal version is executed, security can be improved by checking the access right to both volumes to be paired while suppressing the increase in the communication load associated with the addition of configuration and the increase in the processing load associated with the increase in the items to be checked (in other words, while suppressing the performance deterioration of the overall system). Moreover, since the contents of the remote copy pair creation command input by the user do not need to be changed from the contents of a conventional standard remote copy pair creation command, security can be improved without any additional operational burden on the user.

In addition, with the response performance improved version, since the pair formation completion response is returned to the main-side client 11 at the stage that the remote copy pair is associated (before the synchronization of data is started), the main-side client 11 can receive the response of the remote copy pair creation without being influenced by the processing time required for the external authentication and the access right check using the external authentication server 50 in the sub site storage 40. Accordingly, the data management system 1 which executes the remote copy pair creation processing of the response performance improved version can suppress the deterioration of the response performance caused by the addition of the sub site-side authentication.

Note that, in the explanation of the remote copy pair creation processing of the response performance improved version provided above, while the pair formation program 41 having the copy pair creation function and the authentication program 43 having the external authentication function were isolated as separate modules on the sub site side, the pair formation program 41 may also be configured to have both the copy pair creation function and the external authentication function (in other words, configuration used in the explanation of the remote copy pair creation processing of the normal version).

REFERENCE SIGNS LIST 1, 1A data management system
10 main site server
11, 71 main-side client
20 main site storage
21 pair formation program
22 management information
24 volume
25 resource group
30 sub site server
31, 72 sub-side client
40 sub site storage
41 pair formation program
42 management information
43 authentication program
44 volume
45 resource group
50 external authentication server
51 authentication function
61 in-band network
62 out-of-band network
70 storage management PC
110 access right management table
120 session management table
130 resource group management table
140 pair information management table
150 external authentication server information

The invention claimed is:

1. A data management system capable of creating a remote copy pair with volumes of different storage systems, comprising:
an external authentication server;
a first storage system which includes one or more volumes for storing data and a first central processing unit that performs communication related to a user's authentication with the external authentication server; and
a second storage system which includes one or more volumes for storing data and a second central processing unit that performs communication related to a user's authentication with the external authentication server,
wherein:
when a user logs into the first storage system, the first central processing unit requests the external authentication server to authenticate the user's access right to the first storage system, and retains authentication information issued by the external authentication server when authentication is successful;
when a remote copy pair creation command instructing a creation of a remote copy pair of a first volume of the first storage system and a second volume of the second storage system is issued by the first storage system based on the logged-in user's operation,
the first central processing unit sends the remote copy pair creation command to the second storage system by appending the authentication information;
the second central processing unit requests the external authentication server to authenticate the user's access right to the second storage system using the authentication information appended to the remote copy pair creation command;
when the authentication of the user's access right to the second storage system is successful, the first or the second central processing unit starts synchronization of data between the first volume and the second volume;
the second storage system includes a first function part which creates a remote copy pair, and a second function part which performs authentication using the external authentication server,
when the second storage system receives the remote copy pair creation command from the first storage system,
the first function part instructs activation of the second function part and then sets a pair state of the first volume and the second volume, and thereafter sends, to the first storage system, a response to the remote copy pair creation command,
after the first function part sends the response to the first storage system, the second function part requests authentication of the user's access right to the second storage system and confirms the user's access right to the second volume, and
when authentication of the user's access right to the second storage system is successful and the user's access right to the second volume is confirmed, the first function part starts synchronization of the data.

2. The data management system according to claim 1, wherein the first and the second storage system each have access right information in which the user's access right to each volume of its own storage system is pre-registered, when the remote copy pair creation command is issued to the first storage system, the first storage system confirms the user's access right to the first volume by referring to the access right information based on the user's identification information acquired upon the login, and, when the user's access right to the first volume is confirmed, sends the remote copy pair creation command to the second storage system by appending the identification information and the authentication information,
the second storage system confirms the user's access right to the second volume by referring to the access right information based on the identification information appended to the remote copy pair creation command, and
when authentication of the user's access right to the second storage system is successful and the user's access right to the second volume is confirmed, the first or the second storage system starts synchronization of the data.

3. The data management system according to claim 2, wherein when authentication of the user's access right to the second storage system is successful and the user's access right to the second volume is confirmed, the second storage system sets a pair state of the first volume and the second volume, and sends, to the first storage system, a response to the remote copy pair creation command, and
the first storage system that received the response to the remote copy pair creation command starts synchronization of the data.

4. The data management system according to claim 2, wherein when the second storage system receives the remote copy pair creation command from the first storage system, the second storage system sets a pair state of the first volume and the second volume, and sends, to the first storage system, a response to the remote copy pair creation command,
after sending the response to the first storage system, the second storage system requests authentication of the user's access right to the second storage system and confirms the user's access right to the second volume, and
when authentication of the user's access right to the second storage system is successful and the user's access right to the second volume is confirmed, the second storage system starts synchronization of the data.

5. The data management system according to claim 2, wherein the user's access right is pre-registered in the access right information in units of a resource group in which one or more volumes existing in a same storage system are grouped.

6. The data management system according to claim 3, further comprising:
a client application which issues the remote copy pair creation command to the first storage system according to the user's operation,
wherein, when the first storage system receives a response from the second storage system to the remote copy pair creation command, the first storage system sends, to the client application, a response to the remote copy pair creation command, and thereafter starts synchronization of the data.

7. The data management system according to claim 1, wherein communication between the first storage system and the second storage system, and the external authentication server, is performed via a management-only out-of-band network.

8. The data management system according to claim 1, wherein the authentication information is an authenticated Cookie.

9. A volume access control method performed by a data management system capable of creating a remote copy pair with volumes of different storage systems,
wherein the data management system includes:
a first storage system which includes one or more volumes for storing data and performs communication related to a user's authentication with an external authentication server; and
a second storage system which includes one or more volumes for storing data and performs communication related to a user's authentication with the external authentication server,
wherein the volume access control method comprises:
a login step of the first storage system, when a user logs into the first storage system, requesting the external authentication server to authenticate the user's access right to the first storage system, and retaining authentication information issued by the external authentication server when authentication is successful;
when a remote copy pair creation command instructing a creation of a remote copy pair of a first volume of the first storage system and a second volume of the second storage system is issued by the first storage system based on the logged-in user's operation,
a command sending step of the first storage system sending the remote copy pair creation command to the second storage system by appending the authentication information;
a sub site authentication step of the second storage system, after the command sending step, requesting the external authentication server to authenticate the user's access right to the second storage system using the authentication information appended to the remote copy pair creation command;
a data synchronization step of the first or the second storage system, when the authentication of the user's access right to the second storage system in the sub site authentication step is successful, starting synchronization of data between the first volume and the second volume;
the second storage system includes a first function part in which a creation step of the first function part creates a remote copy pair, and a second function part in which a performing step of the second function part performs authentication using the external authentication server,
when the second storage system receives the remote copy pair creation command from the first storage system,
the first function part includes an instruction step of the first function part that instructs activation of the second function part and then sets a pair state of the first volume and the second volume, and thereafter sends, to the first storage system, a response to the remote copy pair creation command,
after the first function part sends the response to the first storage system, the second function part includes a requesting step of the second function part that requests authentication of the user's access right to the second storage system and confirms the user's access right to the second volume, and
when authentication of the user's access right to the second storage system is successful and the user's access right to the second volume is confirmed, the first function part includes a synchronization step of the first function part that starts synchronization of the data.

10. A non-transitory computer readable medium which records a program to be executed by a processor in a data management system capable of creating a remote copy pair with volumes of different storage systems, wherein the data management system is configured by including:
a first storage system which includes one or more volumes for storing data and performs communication related to a user's authentication with an external authentication server; and
a second storage system which includes one or more volumes for storing data and performs communication related to a user's authentication with the external authentication server, wherein the program executes:
processing of the first storage system, when a user logs into the first storage system, requesting the external authentication server to authenticate the user's access right to the first storage system, and retaining authentication information issued by the external authentication server when authentication is successful;

processing of the external authentication server authenticating the user's access right to the first storage system according to the request and issuing the authentication information when authentication is successful;

when a remote copy pair creation command instructing a creation of a remote copy pair of a first volume of the first storage system and a second volume of the second storage system is issued by the first storage system based on the logged-in user's operation, processing of the first storage system sending the remote copy pair creation command to the second storage system by appending the authentication information;

processing of the second storage system requesting the external authentication server to authenticate the user's access right to the second storage system using the authentication information appended to the remote copy pair creation command;

processing of the external authentication server authenticating the user's access right to the second storage system according to the request;

processing of the first or the second storage system, when the authentication of the user's access right to the second storage system is successful, starting synchronization of data between the first volume and the second volume;

the second storage system includes a first function part which creates a remote copy pair, and a second function part which performs authentication using the external authentication server, when the second storage system receives the remote copy pair creation command from the first storage system, the first function part instructs activation of the second function part and then sets a pair state of the first volume and the second volume, and thereafter sends, to the first storage system, a response to the remote copy pair creation command, after the first function part sends the response to the first storage system, the second function part requests authentication of the user's access right to the second storage system and confirms the user's access right to the second volume, and when authentication of the user's access right to the second storage system is successful and the user's access right to the second volume is confirmed, the first function part starts synchronization of the data.

* * * * *